United States Patent
Hiller et al.

(10) Patent No.: US 10,066,963 B2
(45) Date of Patent: Sep. 4, 2018

(54) SCANNING HEAD

(71) Applicant: BAUMER HUEBNER GMBH, Berlin (DE)

(72) Inventors: Bernhard Hiller, Berlin (DE); Axel Loharens, Berlin (DE); Armin Pfeffer, Teltow (DE); Michael Weiss, Berlin (DE)

(73) Assignee: BAUMER HUEBNER GMBH, Berlin (DE)

( * ) Notice: Subject to any disclaimer, the term of this patent is extended or adjusted under 35 U.S.C. 154(b) by 190 days.

(21) Appl. No.: 14/896,149

(22) PCT Filed: May 7, 2014

(86) PCT No.: PCT/EP2014/059295
§ 371 (c)(1),
(2) Date: Dec. 4, 2015

(87) PCT Pub. No.: WO2014/180879
PCT Pub. Date: Nov. 13, 2014

(65) Prior Publication Data
US 2016/0131502 A1 May 12, 2016

(30) Foreign Application Priority Data

May 7, 2013 (EP) ..................................... 13166894

(51) Int. Cl.
*G01B 7/14* (2006.01)
*G01B 7/30* (2006.01)
(Continued)

(52) U.S. Cl.
CPC ................. *G01D 5/12* (2013.01); *G01D 5/20* (2013.01); *G01D 5/34715* (2013.01);
(Continued)

(58) Field of Classification Search
CPC .............. G01R 25/00; G01R 31/31725; G01R 31/31922
(Continued)

(56) References Cited

U.S. PATENT DOCUMENTS 3,674,934 A * 7/1972 Gooding ............. H04L 27/2275
375/336
4,414,675 A * 11/1983 Comroe ............... H04L 27/2337
327/3
(Continued)

FOREIGN PATENT DOCUMENTS

DE 10 2005 056207 A1 6/2007
DE 10 2007 022765 A1 11/2008
(Continued)

*Primary Examiner* — Giovanni Astacio-Oquendo
(74) *Attorney, Agent, or Firm* — McGlew and Tuttle, P.C.

(57) ABSTRACT

A sensing head (1) for a transducer for capturing rotation or linear parameters, of a rotatable or linearly movable component, in particular of a shaft (13), includes a housing (2), a first sensor unit (3) and a second sensor unit (5) arranged on the housing (2) and arranged in a circumferential direction (U) of the rotatable component offset in relation to each other. The first sensor unit has a first sensor surface (4) and the second sensor unit has a second sensor surface (6). Each of the sensor units (3, 5) can be rotated about a rotation axis (7, 30) such that the sensor surfaces (4, 6) are pivotable to each other in at least two different angular positions. The rotation axes (7, 30) of the sensor units (3, 5) are located on the sides (34, 36) of the sensor units (3, 5); forming the sensor surfaces (4, 6).

15 Claims, 10 Drawing Sheets

(51) Int. Cl.
- *G01R 33/02* (2006.01)
- *G01D 5/12* (2006.01)
- *G01P 1/02* (2006.01)
- *G01D 5/347* (2006.01)
- *G01D 11/24* (2006.01)
- *G01D 11/30* (2006.01)
- *G01D 5/20* (2006.01)

(52) U.S. Cl.
 CPC ........... *G01D 11/245* (2013.01); *G01D 11/30* (2013.01); *G01P 1/02* (2013.01)

(58) Field of Classification Search
 USPC .............................. 324/207.14, 76.11, 76.77
 See application file for complete search history.

(56) References Cited

U.S. PATENT DOCUMENTS

| | | | | |
|---|---|---|---|---|
| 4,669,095 | A * | 5/1987 | Hall .................... | H04L 27/2337 |
| | | | | 329/300 |
| 5,690,110 | A * | 11/1997 | Tanaka ................. | A61B 5/1075 |
| | | | | 600/446 |
| 2008/0249418 | A1 * | 10/2008 | Shikata .................... | A61B 8/08 |
| | | | | 600/459 |
| 2011/0245670 | A1 * | 10/2011 | Tashiro ............... | G01S 7/52084 |
| | | | | 600/443 |

FOREIGN PATENT DOCUMENTS

| | | |
|---|---|---|
| DE | 10 2010 061 738 A1 | 4/2012 |
| EP | 0 560 381 A1 | 9/1993 |
| EP | 0 800 087 A2 | 10/1997 |
| EP | 2 455 721 A2 | 5/2012 |
| EP | 2 660 567 A1 | 11/2013 |

* cited by examiner

SCANNING HEAD

CROSS REFERENCE TO RELATED APPLICATIONS

This application is a United States National Phase Application of International Application PCT/EP2014/059295 filed May 7, 2014 and claims the benefit of priority under 35 U.S.C. § 119 of European Patent Application 13166894.9 filed May 7, 2013 the entire contents of which are incorporated herein by reference.

FIELD OF THE INVENTION

The present invention pertains to a scanning head for a transducer for detecting rotation or linear parameters, for example, the position, speed or acceleration, of a rotatable or linearly movable component, in particular of a shaft or a linear section.

BACKGROUND OF THE INVENTION

In order to determine, for example, the rotation position of a rotatable component, in many cases a material measure (measuring element/measuring reference), which is located opposite a sensor surface of a sensor unit and which is scanned by a sensor surface, is mounted on the rotatable component. Newer systems, which are known, for example, from DE 10 2010 061 738.5, use in this case a material measure, which does not extend over the entire 360° of a rotation and forms a gap between its ends. In order to bridge over this gap, it is necessary to use two or more sensor surfaces, whose distance from one another is greater than the gap, for determining the position. A gap within the material measure is also frequently found in linear measuring systems, since the material measures often cannot be produced or transported for a correspondingly long time. In other measuring systems as well, for example, in those which operate with nonius or additional pseudo-random-code traces, it may be necessary that at least two sensor surfaces, which are arranged offset in a circumferential direction of the rotatable component or in the direction of travel of a linearly movable component, be present.

SUMMARY OF THE INVENTION

Very large, rotatable components are usually manufactured only as single pieces or only in small batches. In such cases, the scanning heads are individually custom-made for each diameter of the rotatable component. This represents a high design effort. An object of the present invention is to provide a scanning head with a reduced manufacturing cost and a simple handling.

The object is accomplished by a scanning head being provided, which can be adapted to shafts or to other rotatable components with diameters of different sizes and/or to linearly movable components at a low cost. For this, a first sensor unit that is arranged at a housing and a second sensor unit with each a first and second sensor surface can be arranged in at least two different angular positions of the sensor surfaces to one another. The sensor units are each configured to be rotatable about a rotation axis, such that the sensor surfaces are pivotable to one another in at least two different angular positions, the rotation axes of the sensor units being located on the sides of the sensor units forming the sensor surfaces.

The advantage of such a design is that the sensor surfaces change the distance from one another relatively little during the pivoting or rotating operation. In the scanning of shafts of different sizes, the distance along the circumferential direction is thus changed comparatively little.

The scanning head designed according to the present invention makes possible, without replacing parts, the measurement at at least two diameters of different sizes and/or the measurement at a linear section by the angular position of the sensor surfaces being adjusted as needed. If the sensor surfaces are sloped more steeply toward one another, they form a smaller angle between them and are suitable for measuring at smaller diameters. For measuring at larger diameters, the angle between the two sensor surfaces is larger. If a linear section shall be measured, the sensor surfaces shall be aligned parallel and flush with one another.

Further developments and embodiments, which are each advantageous in themselves and which can be combined with one another as desired, are described below.

The first and/or second sensor surfaces are advantageously arranged, mounted or fastened pivotably on the housing. Due to the pivotable design, the alignment of the sensor surface can be adapted in several stages or continuously to different diameters of the rotatable component. The alignment of the sensor surfaces can subsequently be carried out such that the maximum sensor surface is always detecting when the material measure (measuring element/measuring reference/reference mark) is moved past, or the air gap between the respective sensor surfaces and the material measure, which is mounted on the rotatable component or on the linear component, is optimal.

The rotation axes lie within the housing in a preferred embodiment.

In another embodiment, the housing comprises an end face, the sensor surfaces pointing at least partially in the same direction as the end face and being located upstream of the end face, the sensor units being located between the sensor surfaces and the end face. The rotation axes may lie at or in front of the end face of the housing.

In another embodiment, a slot-shaped recess is provided on each of the sensor units, such that the sensor units are pivotable within a continuous range. Thus, not only the arrangement of the first and second sensor surfaces in two different angular positions, but in a desired angular position within a continuous range is advantageously possible. Consequently, the scanning head can be used not only for two different diameters, but for diameters in a continuous range.

Via the recess provided on the outer sides of the sensor units which can be connected to the housing via fastening means, the sensor units and thus the sensor surfaces can then be adapted to different diameters.

The scanning head may have a fixing device, which makes it possible to fix first and second sensor units to one another in the at least two angular positions of the sensor surfaces. A change in the angular position may take place in a fixing device only if the fixing device is in a released position.

In an advantageous variant the fixing device protrudes through the slot-shaped recess. For example, a screw can be used as a fixing device, which protrudes through the slot-shaped recess. When the screw is tightened, the sensor unit can consequently be fixed. When the screw is not tightened, the sensor unit can be moved.

The scanning head may have a holding device which can hold the first and/or the second sensor unit in the at least two different angular positions. For example, a plastically deformable component with sufficient stability, e.g., a plate, may be used, in order to hold one or both sensor unit(s).

The sensor surfaces may be flat. As an alternative, they may also be curved. For example, they may be slightly convex in order to allow not only measurements on outer surfaces, but also on concave inner surfaces.

The two sensor surfaces may have a perpendicular direction, which runs perpendicular to the axis of rotation of the rotatable component, for example, the shaft, in one embodiment. In this embodiment the sensor surfaces lie radially spaced apart from and opposite a circumferential surface of the shaft or of a material measure of a linearly movable component.

In another embodiment, the detection takes place axially, i.e., with sensor surfaces spaced axially apart from an end face of the rotatable component, for example, of the shaft or located opposite the end face. In this embodiment, the perpendicular direction of the sensor surfaces runs parallel to the rotation axis of the component. As in the first embodiment, the angular positions of the two sensor surfaces differ in the component which runs tangential to the movement of the point on the rotatable component.

The sensor surface may be part of a sensor unit that may also have, in addition to the sensor surface, other components, for example, circuits for processing signals. The sensor unit may be arranged, mounted or fastened pivotably on the housing.

The first and/or second sensor surfaces may be arranged, mounted or fastened indirectly or directly pivotably on the housing. A direct arrangement would be, for example, an arrangement via a third component, lying between the housing and the sensor surface.

In another advantageous embodiment, one of the two sensor surfaces, for example, the first sensor surface, is fastened immovably to the housing and the other sensor surface, the second sensor surface in this example, is arranged movably, e.g., fastened pivotably to the housing. This embodiment is simpler to produce in comparison to the embodiment with two pivotable or two movable sensor surfaces.

The sensor surfaces and/or sensor unit can be pivotable independently of one another, such that each sensor surface can be optimized in terms of position per se.

In another embodiment, the first and second sensor surfaces are coupled with one another pivotably. The adaptation of the sensor surfaces to different diameters is particularly simple, since only the one or the other sensor surface has to be adjusted, and the other sensor surface is automatically correctly adjusted as well. Such an embodiment requires a comparatively high effort, however.

In another embodiment, the two sensor surfaces and/or sensor units can be connected to one another via an elastic component, for example, a leaf spring, which is connected to the housing in its center.

As was described in examples in the introduction, the use of two sensor units is necessary in some measuring systems in order to bridge over a gap between two sections of the material measure. In this case, the distance between the two sensor units should be greater than the gap, such that at least one sensor unit still scans the material measure in the area of the gap. In other measuring systems, both sensor units are always used simultaneously and the position information is obtained from the combination of the two sensors. In such systems, it may be necessary for the distance of the two sensor units to have a preset value along the material measure. This is the case when two signals, which are offset in relation to one another by a defined phase angle, shall be generated by means of the two sensor units by means of detecting the one measure. Since the distances between the sensor units can differ in different angular positions, it is especially advantageous when the sensor units can be arranged, mounted or fastened at a different distance from one another. Consequently, the distance in the different angular positions can be adjusted correctly.

The sensor units may be sensor units measuring in a contactless manner. For example, inductive, capacitive, magnetic and/or optical methods can be used as measuring methods. The contactless measurement causes less wear than a measurement with a direct contact. The sensor units are magnetically measuring sensor units in an especially advantageous embodiment.

In addition to the first and second sensor units, a third sensor unit can also be provided with a third sensor surface to improve the measurement. The third sensor surface does not have to be arranged in this case in a movable or pivotable manner at the housing, which reduces the manufacturing cost and facilitates the adjusting operation during the mounting of the scanning head. The third sensor surface may be located, for example, between the first and second sensor surfaces.

In order to be able to measure not only the rotation of shafts, but also a linear movement, it is advantageous when the sensor surfaces can be transferred into a first angular position, in which they are flush with one another. In the first angular position, the two sensor surfaces lie in a plane and parallel to one another, such that a straight or flat material measure, as it can be mounted, e.g., on a linearly movable component, can be scanned. The sensor surfaces can, furthermore, be transferred into a second angular position, in which they are not flush with one another, such that measurement is possible on, for example, a shaft or another rotating body.

The two sensor units can scan the same material measure. For this purpose, the first and the second sensor surfaces can lie at the same height, measured along an axial direction. As an alternative, the first sensor surface and the second sensor surface can scan different material measures, for example, a material measure with coarse resolution and a material measure with fine resolution.

The scanning head may comprise an electronic signal processing device, which picks up and at least partially further processes the signals of the sensor units. Processed data can then be forwarded with a single data line.

The present invention is explained in detail below based on exemplary embodiments with reference to the drawings. The different features in the individual exemplary embodiments can be combined with one another in accordance with the above embodiments. In addition, individual features may also be omitted in the exemplary embodiments in accordance with the above description, should the advantage connected with this feature not matter in this specific application. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
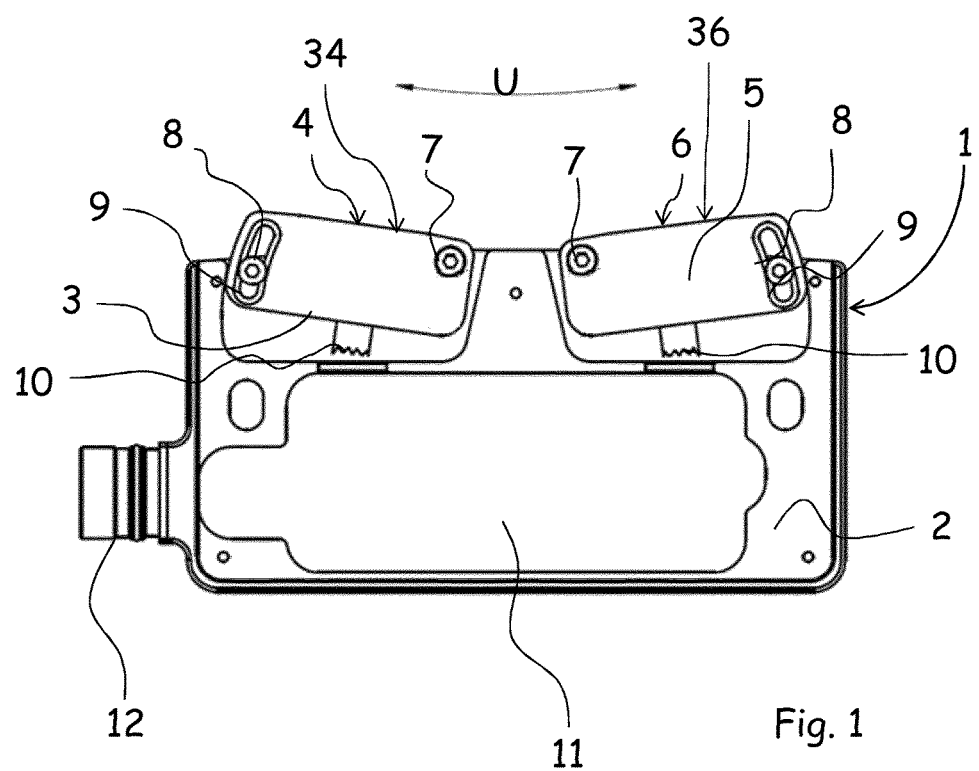
FIG. 1 is a schematic view of a scanning head according to the present invention in a first embodiment.

FIG. 1 shows a schematic view of a scanning head 1 with a housing 2 as well as with a first sensor unit 3 which is arranged on the housing 2 with a first sensor surface 4 and with a second sensor unit 5 which is arranged on the housing 2 and is arranged offset in relation to the first sensor unit 3 in a circumferential direction U of a shaft or of another rotatable component (not shown) with a second sensor surface 6.

The two sensor surfaces 4, 6 are located opposite each other for determining the angular position of a material measure and scan this material measure. A sensor surface 4, 6 may define a preferred direction, along which the measurement is especially efficient. Such a preferred direction may be, for example, perpendicular to the expansion of the sensor surface 4, 6. The two sensor surfaces 4, 6 are offset in relation to one another in the circumferential direction U and are sloped to one another, such that the respective preferred direction is directed at the rotation axis of the rotatable component. In order to make possible a measurement on rotatable components with different diameters and/ or on a linearly movable component, the sensor surfaces 4, 6 can be arranged in relation to one another in at least two angular positions.

The first and the second sensor units 3, 5 are each pivotably fastened to the housing 2 via an axis 7, such that the sensor surfaces 4, 6 are pivotable to one another in at least two different angular positions. The rotation axes 7 of the sensor units 3 and 5 are located in this case on the sides 34 and 36 of the sensor units 3 and 5 forming the sensor surfaces 4 and 6.

The slot-shaped recesses 8 on the sensor units 3, 5 make it possible in this connection for the sensor units 3, 5 to be pivotable within a continuous range. Each of the two sensor units 3, 5 has a fixing device 9, for example, in the form of a screw, which protrudes through the slot-shaped recess 8 and fixes the sensor unit 3 or 5. The scanning head 1 shown here thus makes it possible to fix the first and second sensor surfaces 4, 6 independently of one another in a desired angular position to one another within a continuous range. The scanning head 1 thus designed can be adapted to different shaft diameters. As an alternative to the embodiment shown, slot-shaped recesses could be present on the housing 2 in order to make possible a pivoting.

Each of the two sensor units 3, 5 has, in addition, the sensor surfaces 4, 6, an electronic sensor device (not shown) in the interior of the sensor units 3, 5 as well. The sensor units 3, 5 are connected with only schematically indicated connection elements 10 to an electronic signal processing device (not shown) in a cavity 11 of the scanning head 1. This electronic signal processing device can be used, for example, to further process the sensor signals and to send an already finished position signal and/or speed signal and/or acceleration signal, which is sent via the output 12.

Figure 2:
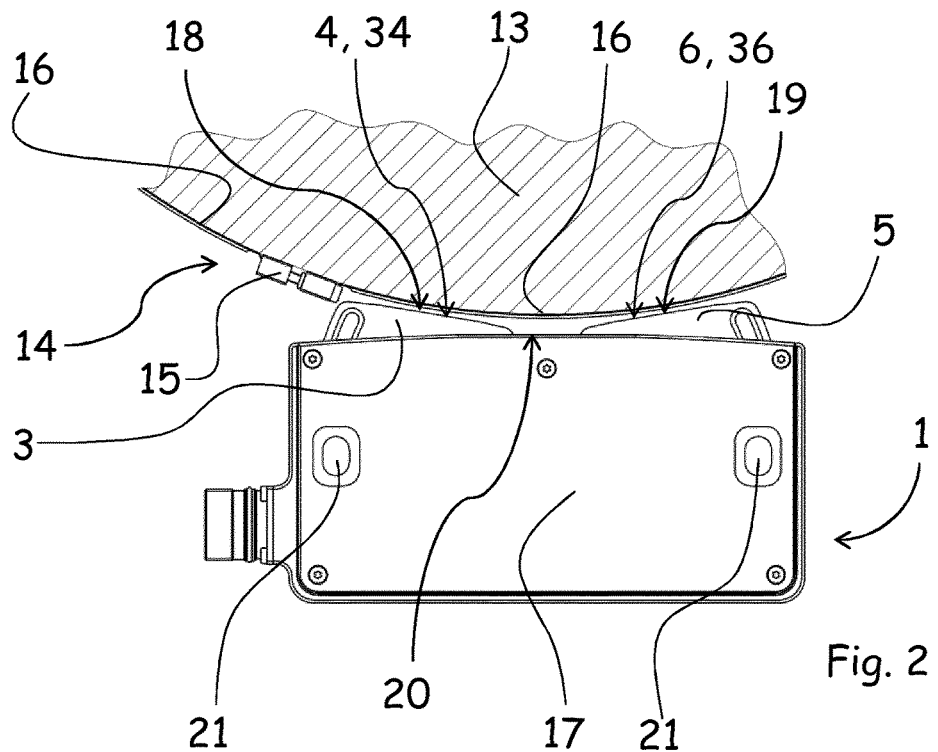
FIG. 2 is a schematic view of a scanning head together with a shaft and a tightening strap mounted on the shaft with a material measure.

FIG. 2 shows a scanning head 1 together with a tightening strap 14. The tightening strap 14 is tightened onto the shaft 13 by means of a tightener 15, as a result of which the tightening strap 14 lies fixed on the circumference of the shaft 13. The tightening strap 14 has a material measure 16 outside of the area of the tightener 15. In this case, it is a magnetic material measure 16, which is detected by the magnetically measuring sensor units 3, 5. In order to bridge over the gap between the areas with the material measure, which gap was caused by the tightener 15 and is necessary for tightening, the scanning head 1 has two sensor units 3, 5, so that at least one sensor unit 3, 5 can always detect and measure the material measure 16.

The two fixing devices 9 of the sensor units 3, 5 shown in FIG. 1 are covered here by a cover 17, as a result of which an unintentional adjustment of the angular position of the two sensor surfaces 4, 6 is prevented.

The outer surfaces 18, 19 of the sensor units 3, 5 pointing toward the shaft 13 and the outer surface 20 of the scanning head pointing toward the shaft 13 have a slightly convex shape, such that it is possible to mount them on shafts of different sizes. Due to the convex shape, it is additionally possible to arrange the sensor surfaces 4, 6 such that they are flush with one another, as a result of which not only the rotary movement of a shaft, but also a linear movement of a flat surface can be detected. Even mounting in the interior of a large hollow shaft is possible by means of this design.

For fastening and for adjusting the scanning head 1, this scanning head 1 has two elongated holes 21, into which the fastening components, for example, screws, can be inserted.

Figure 3:
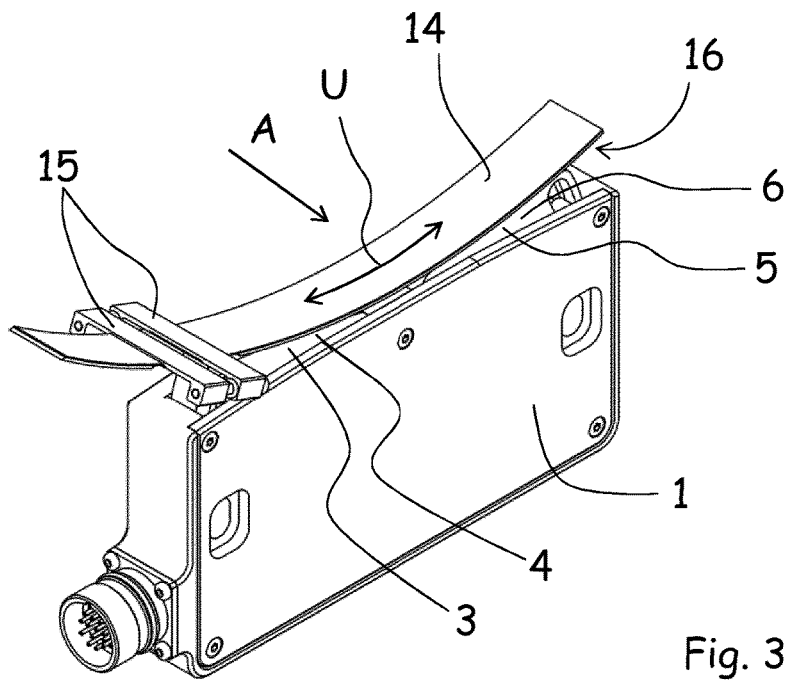
FIG. 3 is a schematic perspective view of a scanning head together with a tightening strap.

FIG. 3 shows a perspective view of a scanning head 1 according to the present invention. The two sensor surfaces 4, 6 of the first or second sensor unit 3, 5 lie at the same height, measured along an axial direction A of the shaft 13.

Both sensor surfaces 4, 6 detect the same material measure 16 that is arranged in the tightening strap 14. In this case, it is a magnetic material measure 16. The sensor units 3, 5 are thus contactless measuring sensor units, in this case magnetically measuring sensor units 3, 5. The measurement takes place in a practically wear-free manner.

As an alternative, the two sensor surfaces 4, 6 could also be arranged offset along the axial direction A of the shaft 13 and detect different material measures. For example, the first sensor surface 4 could detect a coarse graduation, while the second sensor surface 6 detects a fine graduation.

In some measurement methods, it may be necessary for there to be a defined distance along the circumferential direction U between the first sensor surface 4 and the second sensor surface 6. In an advantageous embodiment, the distance of the two sensor surfaces 4, 6 can therefore be adjusted, for example, by the sensor units being designed as capable of being arranged, mounted or fastened at different distances from one another.

The sensor units 3, 5 shown in FIGS. 1 through 3 are pivotable independently of one another. It is consequently possible that the scanning head 1 can be arranged in a comparatively broad range in relation to the shaft 13. In FIG. 2 the scanning head 1 could also be arranged farther to the left or farther to the right. In order to compensate for this offset, one of the two sensor units 3 or 5 and thus the one sensor surface 4 or 6 would have to be pivoted farther inwards and the other sensor unit 5 or 3 with the other sensor surface 6 or 4 would have to be pivoted farther outwards.

As an alternative, the two sensor units 3, 5 and thus the two sensor surfaces 4, 6 could be coupled with one another in a pivotable manner, for example, via a gear (not shown) or via separate drives. Such an embodiment would simplify the adaptation to the shaft diameter, since only one sensor unit 3 or 5 would have to be adjusted and the other sensor unit 5 or 3 would be automatically correctly adjusted as well. However, it would be necessary for the relative position between the scanning head 1 and the shaft 13 to be comparatively accurately fixed.

FIGS. 4 through 18 show different measuring possibilities of scanning heads 1 according to the present invention.

Figure 4:
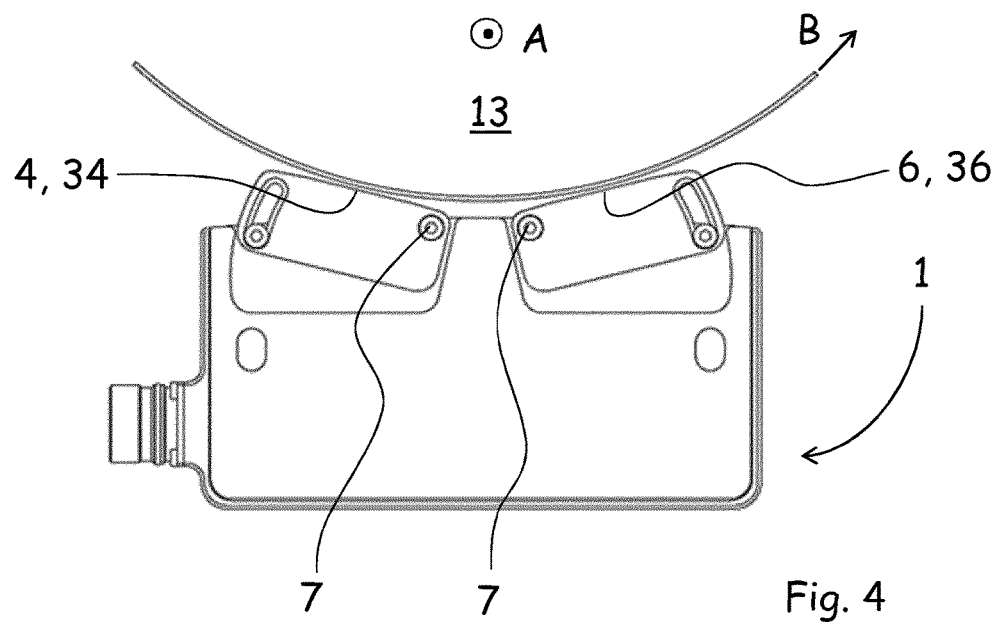
FIG. 4 is a schematic cross section of a scanning head together with a shaft having a first diameter.

In FIG. 4, the measurement is carried out on the outer circumference of a shaft 13. Because the two sensor surfaces 4, 6 can be arranged in different angular positions, measurements on shafts 13 of different sizes are possible.

The measurement in FIG. 4 is carried out tangentially. The two sensor surfaces 4, 6 extend in a direction which runs tangential to the direction of movement B of the rotation of a point on the outer surface of the shaft 13. In addition, the sensor surfaces 4, 6 extend in a direction which runs parallel to the axial direction A of the shaft 13. The two sensor surfaces 4, 6 are in this case each pivotable about an axis 7. The rotation axes 7 allow a pivoting movement about the axial direction A of the shaft 13. In the different angular positions, the sensor surfaces 4 and 6 have intermediate angles of different sizes. The two sensor surfaces 4 and 6 are thus not flush in a measurement on a shaft. A measurement on a shaft having a comparatively small diameter can be seen in FIG. 4.

Figure 5:
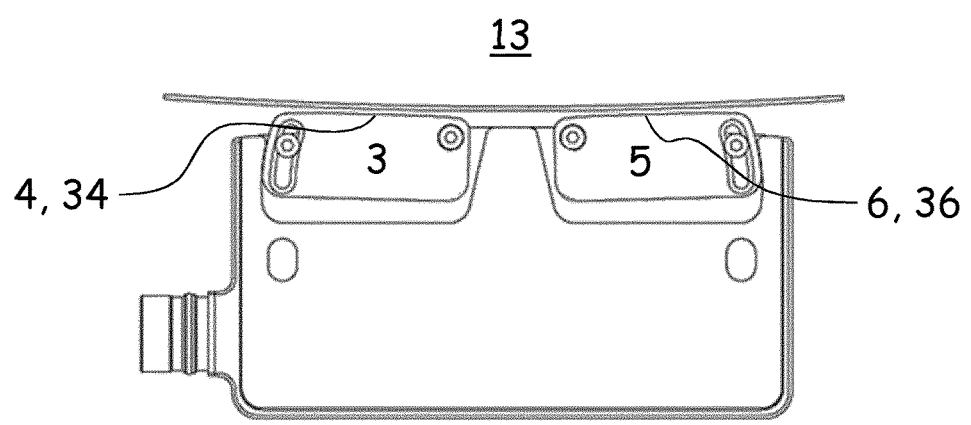
FIG. 5 is a schematic cross section of a scanning head together with a shaft having a second diameter.

A measurement on a shaft 13, whose diameter is large in comparison to the shaft in FIG. 4, can be seen in FIG. 5. The sensor surfaces 4 and 6 of the sensor units 3 and 5 have a different angular position than in FIG. 4.

Figure 6:
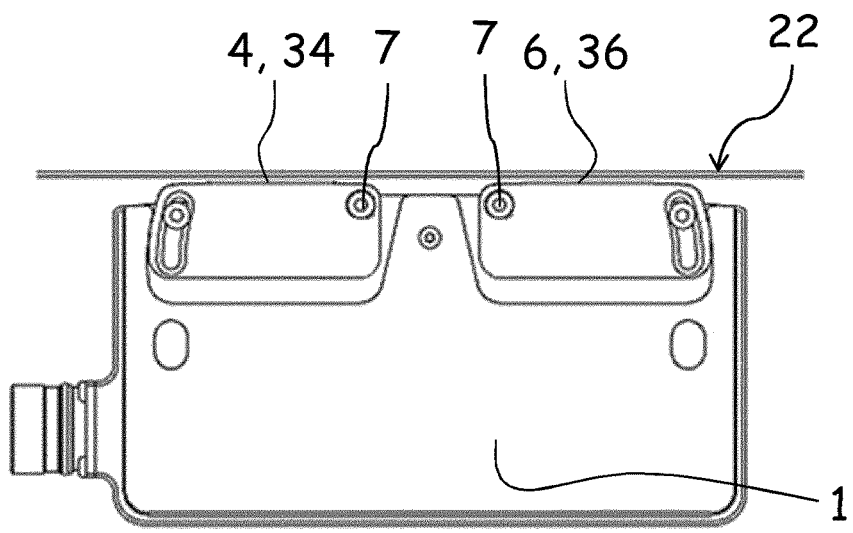
FIG. 6 is a schematic view of a scanning head, which is embodied for measuring the movement of a flat surface.

FIG. 6 shows the scanning head 1 in an angular position, in which the two sensor surfaces 4, 6 are flush with one another. It is consequently possible to measure the movement of a flat surface 22, which can belong, for example, to a linearly movable component.

Figure 7:
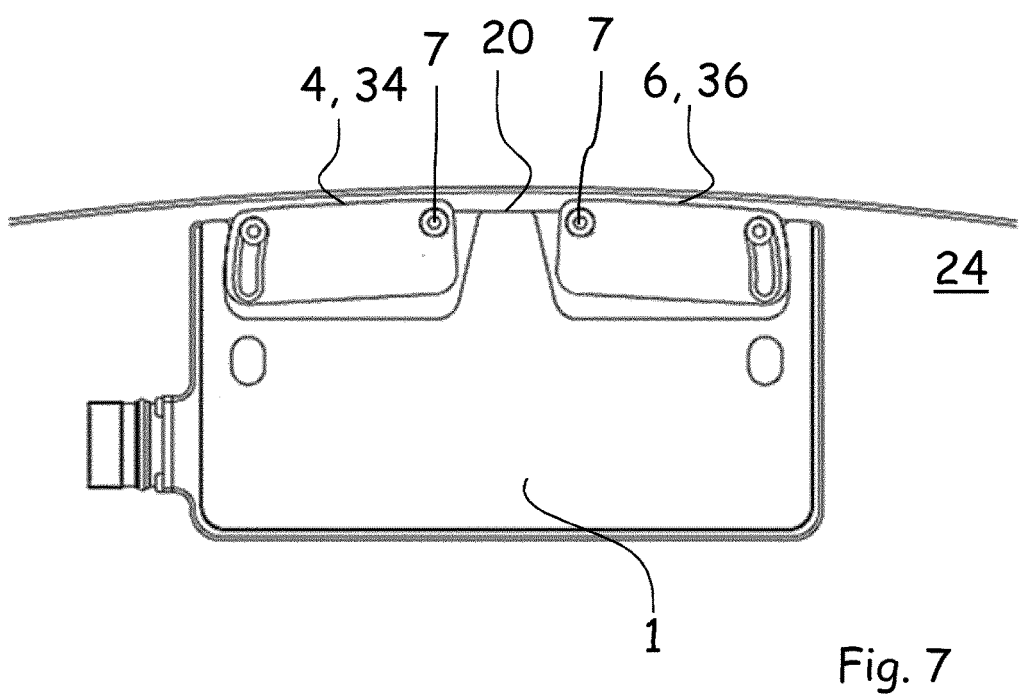
FIG. 7 is a schematic cross section of a scanning head for internal scanning of a hollow shaft.

FIG. 7 shows how the scanning head 1 is used for measuring a rotation of a hollow shaft 24 on an inner side of the hollow shaft 24. Due to the convex shape of the outer surface 20 of the scanning head 1, it is possible to measure on an inner surface of the hollow shaft 24 as well. For this, the sensor surfaces 4, 6 are pivoted toward the rest of the scanning head 1. The measurement shown in FIG. 7, like the measurement in FIG. 4, is a tangential measurement.

Figure 8:
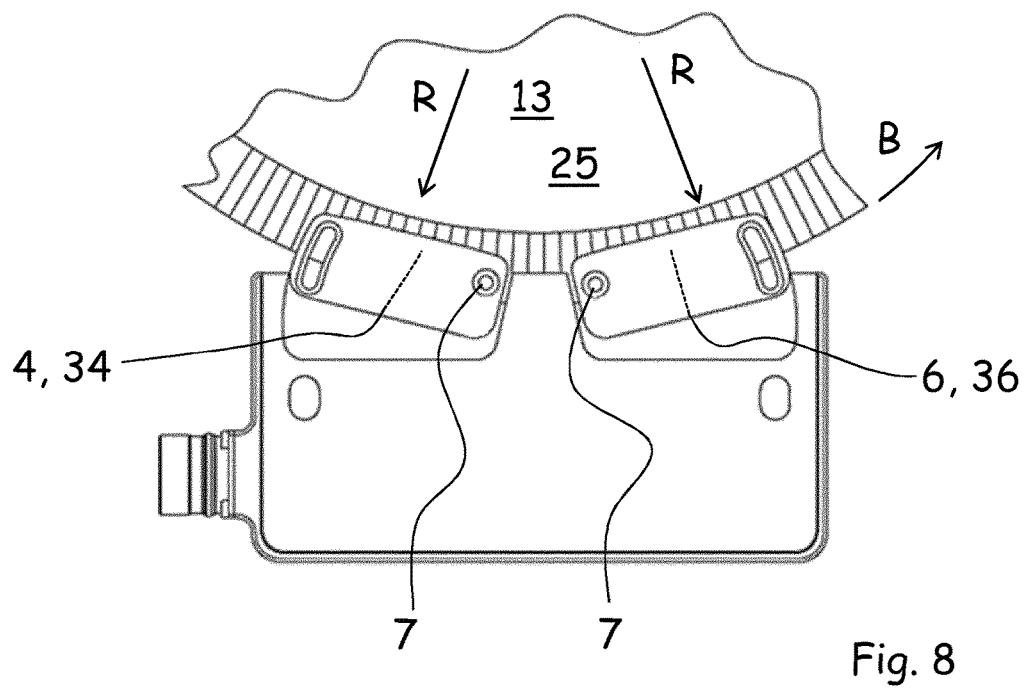
FIG. 8 is a schematic view of a scanning head for the axial detection of the rotation of a shaft having a first diameter.

FIG. 8 shows an axial measurement. In this axial measurement the measurement is not carried out on an outer or inner surface of a shaft 13, both on an end face 25 of the shaft 13. The two sensor surfaces 4, 6 scan a material measure 16, for example, in the form of a code track, which is arranged on the end face 25. They extend along a radial direction R of the shaft 13 and in a direction, which runs tangential to the direction of movement B of the rotation of a point on the end face of the shaft 13. Thus, they lie parallel to the end face 25.

Figure 9:
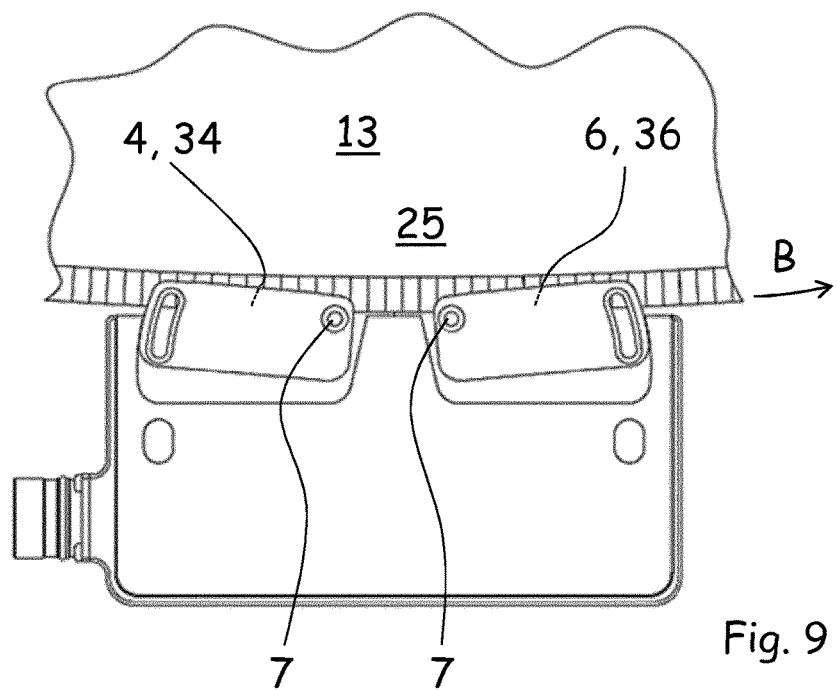
FIG. 9 is a schematic view of a scanning head for the axial detection of the rotation of a shaft having a second diameter.

FIG. 9 also shows an axial measurement. The angular positions of the covered sensor surfaces 4, 6 differ in FIG. 8 and FIG. 9 in the direction tangential to the direction of movement B. In both angular positions, the sensor surfaces 4, 6 lie in one plane. They are pivoted through the rotation axes 7 about an axial direction A of the shaft 13.

The scanning head 1 does not have a fixing device, with which the angular position can be fixed, in FIGS. 8 and 9. The two sensor units could, however, be held via a holding device, for example. Thus, for example, a plastically deformable component such as a plate could be arranged between the two sensor units to hold the two sensor elements. As an alternative, the angular position could be fixed, for example, by means of casting with a curable resin or by means of a bonding agent.

Figure 10:
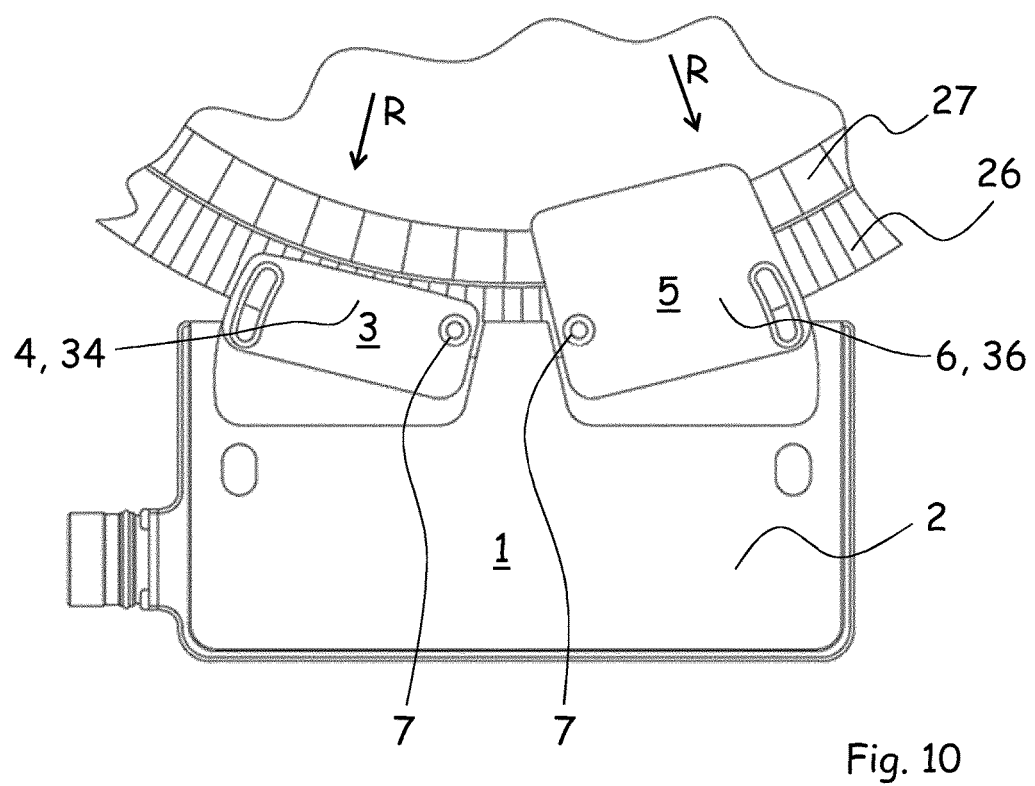
FIG. 10 is a schematic view of a scanning head for the axial detection of the rotation of a shaft with a plurality of material measures.

FIG. 10 shows another advantageous embodiment of a scanning head 1. The first sensor unit 3 scans a material measure 26 with a fine resolution. The second sensor unit 5 scans the material measure 26 with a fine resolution and a material measure 27 with a coarse resolution. For this, the second sensor unit is broader than the first sensor unit 3 as measured in the radial direction R. It may have one broad or two narrower sensor surfaces.

In addition to the two sensor units 3, 5 shown in the figures, additional sensor units may be present as well. For example, a third sensor unit may be present, which is immovable in relation to the rest of the scanning head. This third sensor unit could be located, for example, between the two sensor surfaces 4, 6.

Figure 11:
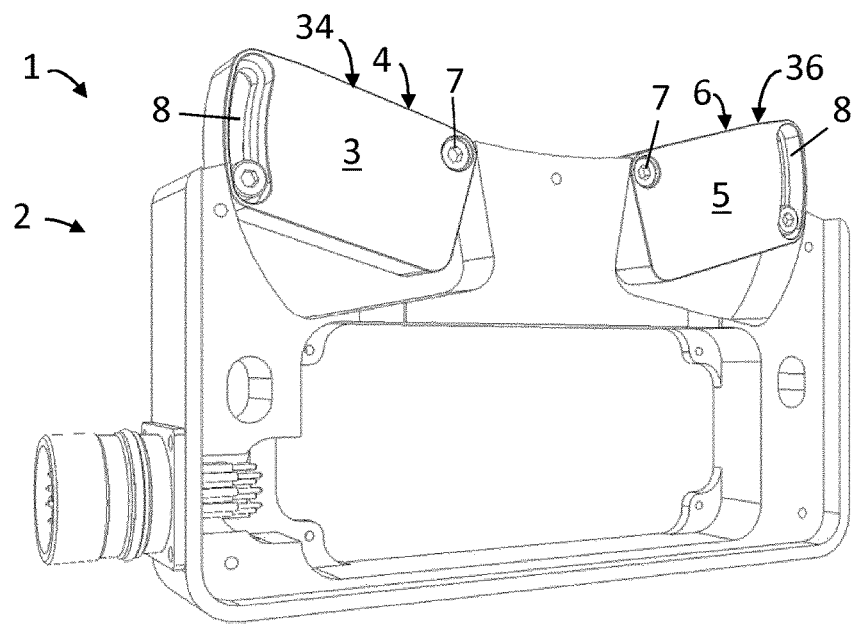
FIG. 11 is a schematic perspective view of another scanning head, which is adjusted for an external detection of a shaft.

FIG. 11 shows another scanning head 1. It comprises again a first sensor unit 3 with a first sensor surface 4 and a second sensor unit 5 with a second sensor surface 6. The sensor units 3, 5 are each connected to the housing 2 via an axis 7. Furthermore, the slot-shaped recesses 8 that are mounted on the outside on the sensor units 3, 5 allow an arrangement of the two sensor units 3, 5 in different angular positions in relation to one another, such that, for example, shafts of different sizes can be scanned on the inside and on the outside. The sensor units 3, 5 are thus rotatable/pivotable about the rotation axes 7. The rotation axes 7 of the sensor units 3, 5 are located on the sides 34, 36 forming the sensor surfaces 4, 6.

Figure 12:
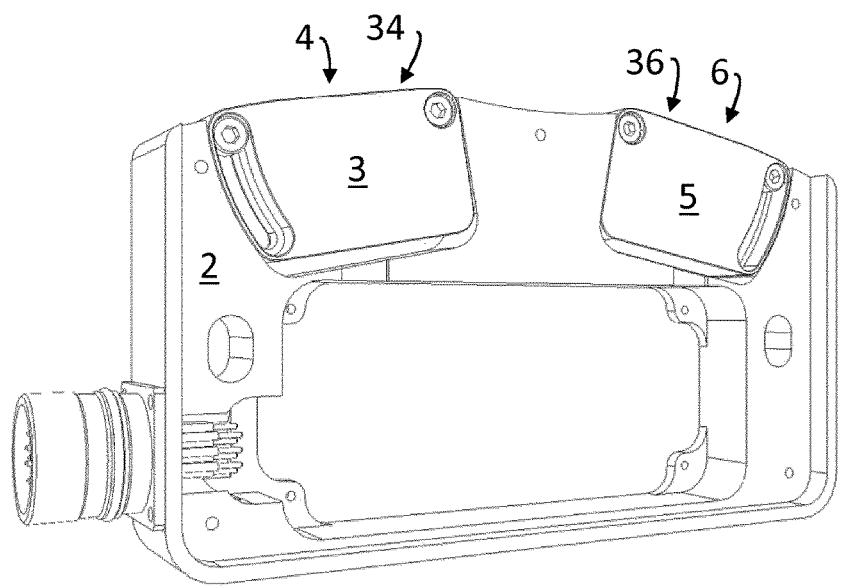
FIG. 12 is a schematic perspective view of the scanning head from FIG. 10, which is adjusted to an internal detection of a hollow shaft.

FIG. 12 shows a scanning head 1, wherein this scanning head is adjusted to an inner scanning of a hollow shaft. The two sensor surfaces 4, 6 thus have different angular positions in relation to one another than in FIG. 11. The two sensor surfaces 4, 6 point away from one another in FIG. 12, while they rather point toward one another in FIG. 11.

Figure 13:
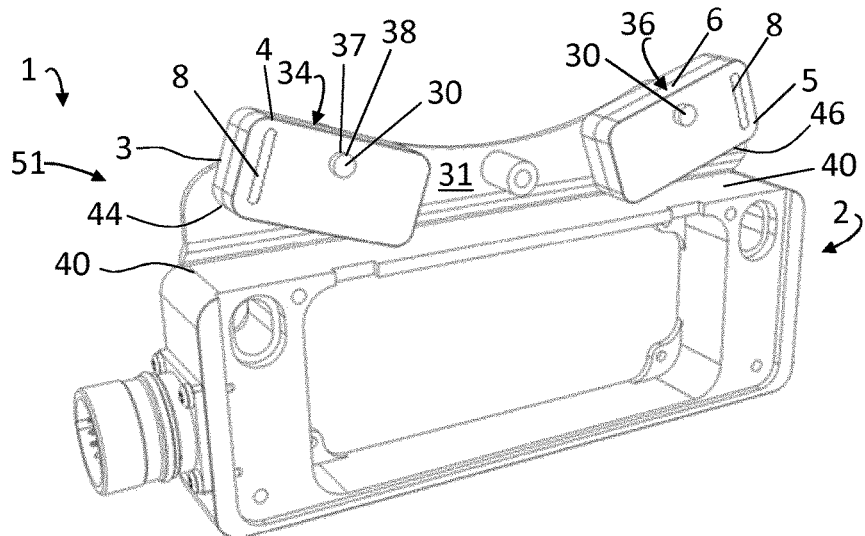
FIG. 13 is a schematic perspective view of parts of a scanning head according to the present invention.

FIG. 13 shows a scanning head 1 with a housing 2, in which parts are removed. The scanning head 1 comprises again a first sensor unit 3 with a first sensor surface 4 and a second sensor unit 5 with a second sensor surface 6. The first sensor surface 4 and the second sensor surface 6 point at least partially in the same direction as an end face 40 of the housing 2, i.e., the perpendicular directions of the sensor surfaces 4 and 6 have components that are parallel to the surface normals of the end face 40. The two sensor surfaces 4, 6 and the end face 40 each point in the outward direction from the housing 2. The sensor surfaces 4, 6 are located upstream of the end face 40 in this case. They are located farther outward than the end face 40. The sensor units 3, 5 are located between the sensor surfaces 4, 6 and the end face 40. A narrow design is consequently possible in the area of the sensor surfaces 4, 6, since the sensor units 3, 5 lie outside of the housing and the width of the scanning head 1, measured along the width direction W in the area of the sensor surfaces 4, 6, can consequently be smaller than in the area of the housing 2. This allows a greater tolerance in the front/outer area 51. For example, movements or changes in position/length of the component to be measured, which develop, for example, because of temperature-dependent expansions, are better tolerated as a result.

The sensor units 3, 5 are each rotatable about rotation axes 30 that run through axles 37. The axles 37 are formed by projections 38 on the sensor units 3, 5, which are arranged in holes 39 on the side plates 31 (see FIG. 14). The rotation axes 30 are located on the sides 34, 36 of the sensor units 3, 5 forming the sensor surfaces 4, 6. The rotation axes 30 are thus located closer to the sides 34, 36 of the sensor units 3, 5 forming the sensor surfaces 4, 6 than to the sides 44, 46 located opposite the sensor surfaces 4, 6. In particular, they are located centrally in relation to the sensor surfaces 4, 6. A change in the distance of the sensor surfaces 4, 6 from each other is minimized based on this design in case of a change in the angular position in relation to one another.

Also, the fact that the rotation axes 30 lie outside of the housing, in particular in front of the end face 40 of the housing 2, contributes to the adaptation to different shaft diameters being especially simple.

The sensor units 3, 5 are each designed as separate components and are located entirely in front of the end face 40 of the housing 2.

Figure 14:
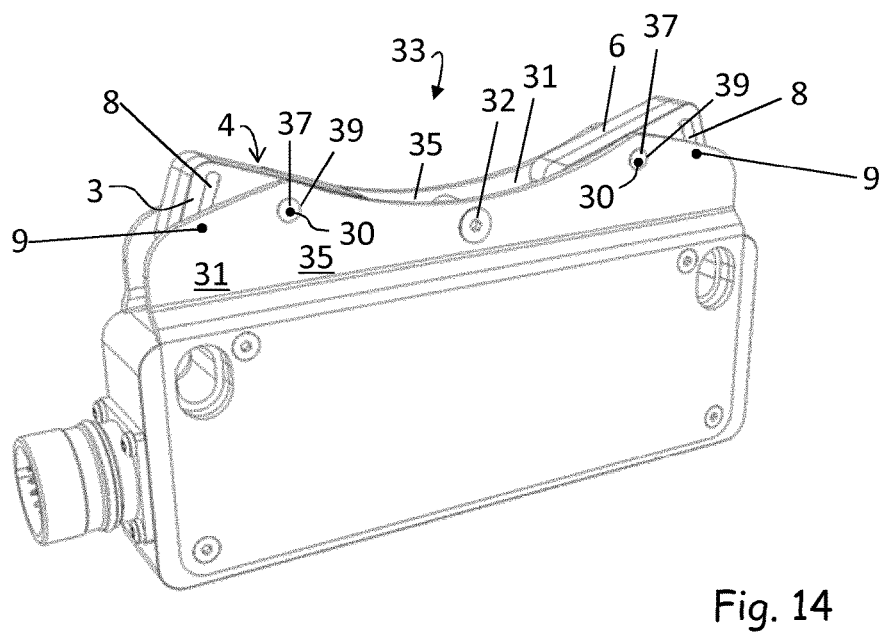
FIG. 14 is a schematic perspective view of the scanning head from FIG. 13, which is adjusted to an external detection of a shaft.

FIG. 14 shows the scanning head from FIG. 13 in the fully mounted state, i.e., without the parts missing in FIG. 13.

The two sensor units 3, 5 are here again adjusted for the external scanning of a shaft. They point toward one another.

The two sensor units 3, 5 are mounted between two side plates 31, which together with a screw 32 that can be tightened, are used as a fixing device 33, with which the angular positions of the two sensor units 3, 5 can be fixed at the same time. The fixing device 33 shown can thus be operated with only one hand here. The two side plates 31 act as clamping elements 35, between which the sensor units 3, 5 are arranged and with which the sensor units 3, 5 can be clamped.

The holes 39 that receive the axles 37 and are thus used as mounts for a rotation of the axes 7 about the rotation axis 30 are arranged at the outer ends of the side plates 31. In this area, the side plates 31 protrude farthest from the housing 2 in relation to a vertical direction H. Between the holes 39, the side plates 31 have a concave shape in order to be able to receive the shaft as well as possible in case of an external scanning The plates 31 protrude laterally to the outside less far from the housing 2 in order to make it possible to place the scanning head 1 as close as possible on the inner surface of the hollow shaft in case of an internal scanning The sensor units 3, 5 can additionally be guided through a slot-shaped recess 8. As an alternative or in addition to the tightenable screw 32 being used as a fixing device 33, a fixing device 9 each can be provided for fixing the sensor units 3, 5. In the simplest case, the fixing device 9 is designed as a tightenable screw.

Figure 15:
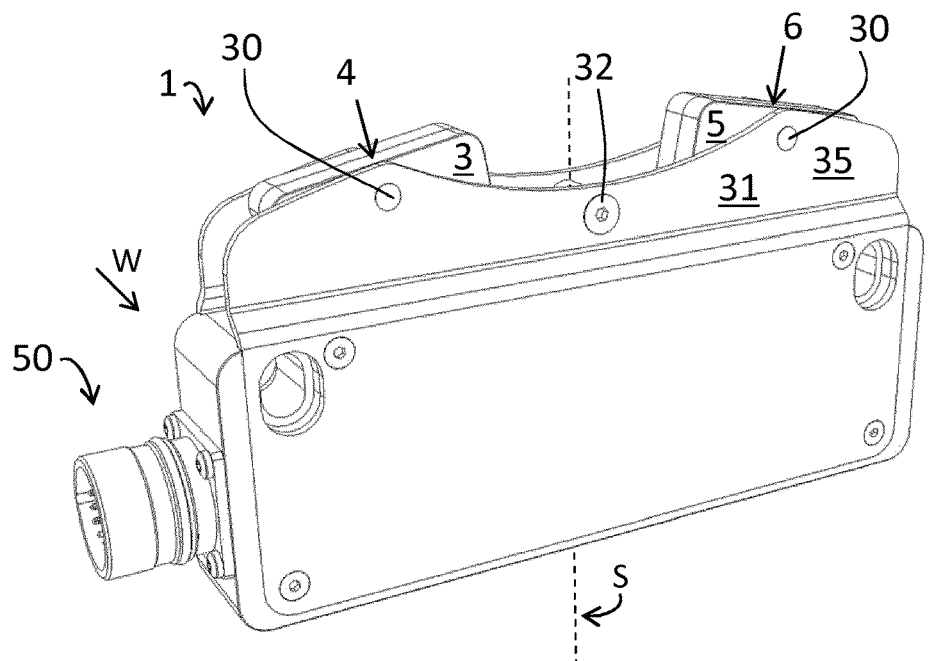
FIG. 15 is a schematic perspective view of the scanning head from FIG. 14, which is adjusted to an internal detection of a hollow shaft.
Figure 16:
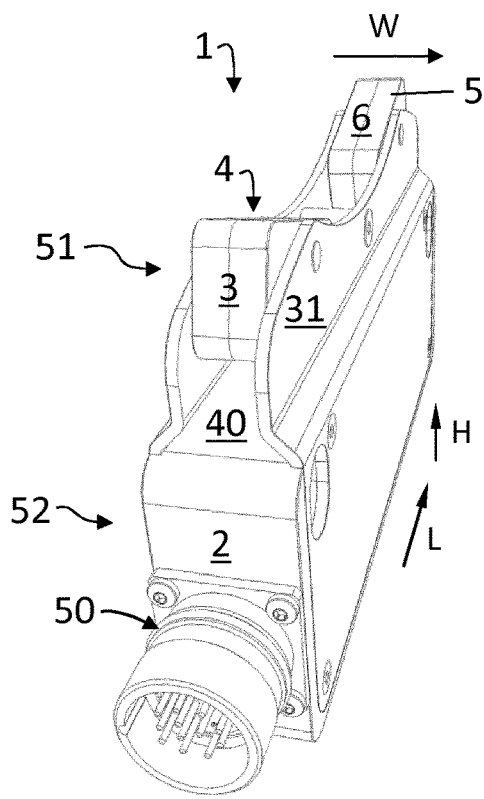
FIG. 16 is a schematic perspective view of the scanning head from FIGS. 13 through 15.

FIG. 15 shows an adjustment of the sensor units 3, 5, with which an internal scanning of a hollow shaft is possible. The sensor surfaces 4, 6 point away from one another in this case.

In order to ensure as reliable a hold as possible of the sensor units 3, 5, the sensor units 3, 5 and/or the clamping elements 35 can have roughened areas, fluted areas or coatings with a high coefficient of friction.

As with the other scanning heads 1, the scanning head 1 from FIG. 15 has, apart from an electric connection element 50, a twofold symmetry of rotation. A rotation about an axis of symmetry S by 180° reproduces the scanning head 1 again to itself. The sensor units 3, 5 are changed in this case, i.e., they change places. The axis of symmetry S runs in this case centrally through the scanning head 1 and through the tightenable screw 32. It runs from a side that is facing toward the shaft to a side that is facing away from the shaft, when the scanning head 1 is mounted for measuring on the shaft. Such a symmetrical design leads to the scanning head being able to be mounted in two different orientations and the person performing the mounting no longer has to pay attention to the correct orientation during the mounting. Nevertheless, the analysis software, which analyzes the signals coming from the scanning head 1, must, of course, be designed such that it tolerates different mounting orientations.

A thickness D1 of the scanning head 1, measured in an outer area 51, which is measured in a width direction W, is smaller than a thickness D2 of the scanning head 1 measured in an inner area 52. The outer area 51 lies on the side on which the sensor units 3, 5 lie.

Figure 17:
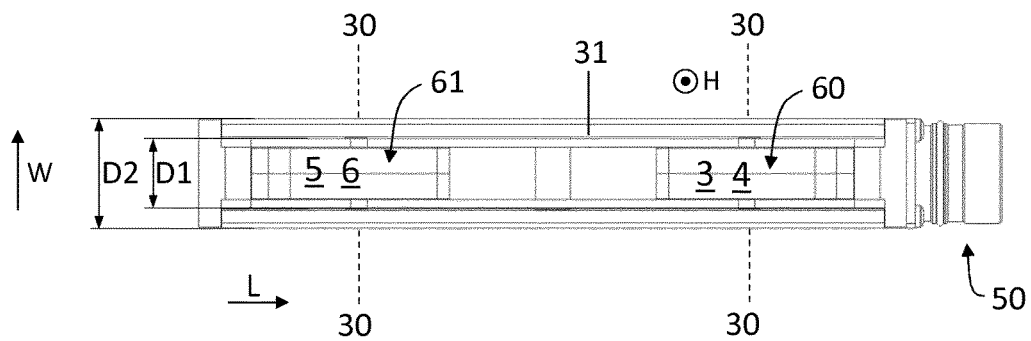
FIG. 17 is a schematic view from above of the scanning head from FIGS. 13 through 16.

The narrower design on the outer area 51 can be easily seen in a top view in FIG. 17. The top view in this case shows the view along a vertical direction H, with the vertical direction H running perpendicular to the longitudinal direction L and perpendicular to the width direction W. In the width direction W, the scanning head 1 has a smaller extension than in the longitudinal direction L and than in the vertical direction H.

It can also be seen in FIG. 17 that the distance of the central areas 60, 61 of the sensor surfaces 4, 6 hardly changes during a rotation of the sensor units 3, 5 about the rotation axes 30.

Figure 18:
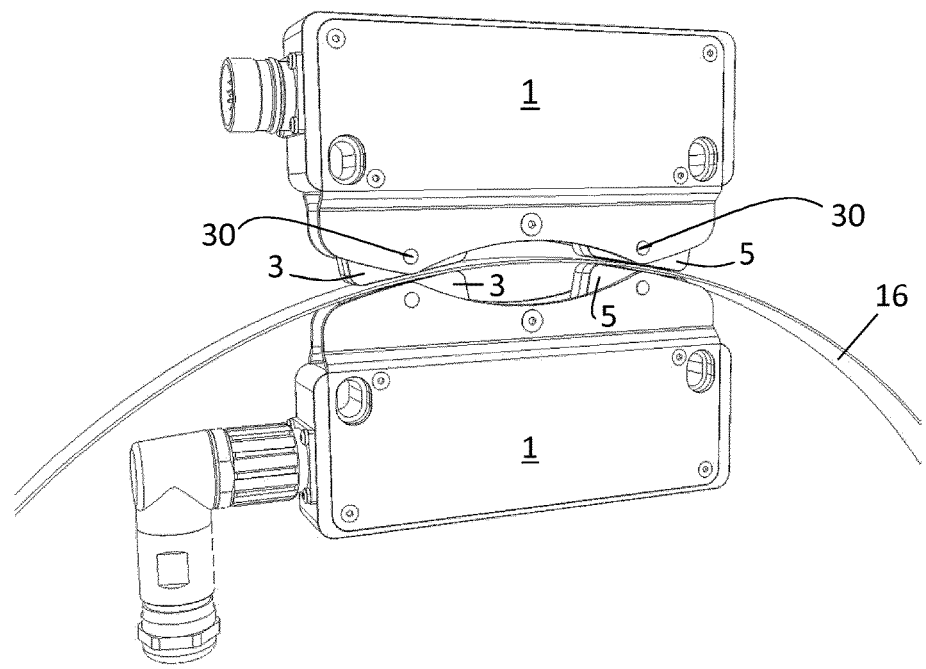
FIG. 18 is a schematic perspective view of two scanning heads according to FIGS. 13 through 17, which scan a material measure on the outside or on the inside.

FIG. 18 shows two scanning heads 1, one scanning head 1 scanning a material measure 16 on the outside and the other scanning head 1 scanning the material measure 16 on the inside. This shows that the same scanning head 1 can be used for scanning both the inside and the outside by means of rotating the sensor units 3, 5.

In addition to the twofold symmetry of rotation about the axis S, which runs through the screw 75 arranged in the center 72 along the vertical direction H, the scanning head 1, as well as the other scanning heads, has a mirror symmetry in relation to a plane, which runs parallel to the plane defined by the vertical direction H and the longitudinal direction L and passes centrally through the housing. It is thereby achieved that there is no offset of the sensor units 3, 5 along the width direction W during a rotation about the longitudinal direction L, as took place, for example, in the two scanning heads in FIG. 18.

In addition to the two sensor units 3, 5 shown in the figures, additional sensor units may be present as well. For example, a third sensor unit may be present, which is immovable in relation to the rest of the scanning head. This third sensor unit could be located, for example, between the two sensor surfaces 4, 6.

All in all, the scanning head according to the present invention makes possible, due to its design, an adaptation to different shaft diameters in a technically simple way.

While specific embodiments of the invention have been shown and described in detail to illustrate the application of the principles of the invention, it will be understood that the invention may be embodied otherwise without departing from such principles.

The invention claimed is:

1. A transducer scanning head for detecting rotation or linear parameters, of a rotatable or linearly movable component, the scanning head comprising:
a housing;
a first sensor unit arranged at the housing, the first sensor unit comprising a first sensor surface; and
a second sensor unit arranged at the housing and arranged offset in relation to the first sensor unit in a circumferential direction of the rotatable component or in a longitudinal direction of the linearly movable component, the second sensor unit comprising a second sensor surface, each of the sensor units being rotatable about a rotation axis such that the first sensor surface and the second sensor surface are pivotable to one another in at least two different angular positions, wherein the rotation axes of the sensor units are located on respective sides of the sensor units forming the first sensor surface and the second sensor surface.

2. The scanning head in accordance with claim 1, wherein the rotation axes lie within the housing.

3. The scanning head in accordance with claim 1, wherein the housing comprises an end face, and the first sensor surface and the second sensor surface point at least partially in the same direction as the end face and are located upstream of the end face with respect to motion of the rotatable or linearly movable component, the sensor units being located between the first sensor surface, the second sensor surface and the end face.

4. The scanning head in accordance with claim 3, wherein the respective rotation axes lie outside of the housing.

5. The scanning head in accordance with claim 3, wherein the respective rotation axes lie on or in front of the end face of the housing.

6. The scanning head in accordance with claim 1, wherein a slot-shaped recess is provided at each of the sensor units, such that the sensor units are pivotable within a continuous range.

7. The scanning head in accordance with claim 6, wherein each of the two sensor units has a fixing device, which makes possible a fixing of the first and second sensor unit to one another in the at least two different angular positions of the first sensor surface and the second sensor surface.

8. The scanning head in accordance with claim 7, wherein the fixing device is configured to protrude through the slot-shaped recess and fixes the sensor units.

9. The scanning head in accordance with claim 1, further comprising a fixing device acting simultaneously on the two sensor units, by means of which the angular positions of the two sensor units can be fixed.

10. The scanning head in accordance with claim 1, wherein the first sensor surface and the second sensor surface are pivotable independently of one another.

11. The scanning head in accordance with claim 1, wherein the first sensor surface and the second sensor surface are pivotably coupled with one another.

12. The scanning head in accordance with claim 1, wherein the first sensor surface and the second sensor surface are arranged opposite an end face of the rotatable component and a material measure provided at the end face can be detected by the first sensor surface and the second sensor surface.

13. The scanning head in accordance with claim 12, wherein the second sensor unit is configured to be broader than the first sensor unit as measured in a radial direction.

14. The scanning head in accordance with claim 1, wherein the sensor units are sensor units measuring in a contactless manner comprising one of a magnetic and an inductive manner.

15. The scanning head in accordance with claim 1, further comprising a third sensor unit with a third sensor surface, with the third sensor surface not being arranged movably at the housing.

* * * * *